United States Patent

[11] 3,615,166

| [72] | Inventors | Saul G. Hindin<br>Mendham;<br>Joseph C. Dettling, Jackson, both of N.J. |
|------|-----------|---|
| [21] | Appl. No. | 833,775 |
| [22] | Filed | June 16, 1969 |
| [45] | Patented | Oct. 26, 1971 |
| [73] | Assignee | Engelhard Minerals & Chemicals Corporation<br>Newark, N.J. |

[54] CATALYSTS FOR PURIFICATION OF WASTE GASES CONTAINING OXIDES OF NITROGEN
12 Claims, No Drawings

| [52] | U.S. Cl. .................................................. | 23/2 E, |
| | 252/462, 252/466 PT, 252/477 | |
| [51] | Int. Cl. ..................................................... | C01b 2/30 |
| [50] | Field of Search ........................................... | 23/2; |
| | 252/461, 462, 466, 477 | |

[56] References Cited

UNITED STATES PATENTS

| 2,668,752 | 2/1954 | Folkins .......................... | 23/206 |
| 3,507,813 | 4/1970 | Vrbaski .......................... | 252/464 |
| 2,202,637 | 5/1940 | Müeller .......................... | 23/21 |
| 2,552,555 | 5/1951 | Houdry .......................... | 252/466 X |

Primary Examiner—Daniel E. Wyman
Assistant Examiner—Philip M. French
Attorneys—Samuel Kahn and Miriam W. Leff ABSTRACT: Improved catalysts for use in the purification of waste gases containing oxides of nitrogen comprise high surface area thoria or zirconia as a support for a catalytic deposit. The catalysts exhibit exceptionally high stability in the reaction environment.

CATALYSTS FOR PURIFICATION OF WASTE GASES CONTAINING OXIDES OF NITROGEN

BACKGROUND OF THE INVENTION

1. Field of the Invention

It is known that certain chemical processes produce and discharge into the atmosphere waste gases containing oxides of nitrogen, e.g. $NO_2$ and NO, and such waste streams constitute an air pollution problem. This problem is particularly acute in the manufacture of nitric acid by ammonia oxidation since it is difficult to convert all the oxides of nitrogen to nitric acid and a considerable quantity of such oxides are present in the waste or tail gases. One route for the purification of such streams is by catalytic treatment with a reducing fuel to decolorize or remove the noxious constituents in the streams. The removal of the noxious constituents is more difficult than mere decolorization of the stream but demands for true pollution abatement have been constantly increasing.

2. Description of the Prior Art

In the past many processes have been proposed for the catalytic purification of waste streams with a reducing fuel. In such processes the off-gases are generally treated in one or more stages with various fuels. Among the fuels useful for the purification process are hydrocarbons such as $CH_4$ and natural gas, Udex Raffinates, $NH_3$, $H_2$, CO, etc. Methane and natural gas are often used because of their availability and relatively low cost. The catalyst requirements for the purification process are critical. Two important criteria are the ignition temperature and catalyst life. Platinum group metals have been found most effective, particularly with regard to the ignition temperatures. The platinum group metals have been supported on various carriers, e.g. high surface area refractory oxides, particularly activated alumina, or kieselguhr. The preferred catalysts vary with, for example, the fuel and process conditions. Supported rhodium or palladium catalysts have been preferred when methane is used as the reducing fuel for nitric acid tail gas streams since they ignite the methane at relatively low temperatures.

While many of the catalytic abatement systems for treating waste gas streams such as nitric acid plant tail gas have been useful, none of them have been entirely satisfactory. On of the main problems is that catalysts are too readily deactivated, first becoming increasingly less effective for the removal of oxides of nitrogen, and eventually ineffective for combustion of the fuel added.

In accordance with the present invention catalysts have been found which are highly effective for the treatment of waste gases containing oxides of nitrogen and which have exceptionally high stability and therefore long life in the reaction environment.

SUMMARY OF THE INVENTION

Briefly, the catalysts of the present invention are comprised of a core of an inert refractory material having a particle size of 0.01 to 10 microns in size, a coating of thermally stable thoria or zirconia substantially covering the core material, and a catalytic metal deposited on such coating. The thermally stable thoria or zirconia has a surface area of at least 50 square meters per gram after calcination at 1,000° C. for 4 hours. X-ray diffraction patterns of the thoria or zirconia coated core material show essentially only the coating.

THERMAL STABILITY OF CATALYST CARRIER MATERIAL

In the purification processes the catalysts are subjected to temperatures of over 500° C. e.g. about 750° C., for long periods of time. It is believed that one of the major factors contributing to the deactivation of the catalysts is the inability of the conventional refractory oxide carriers to withstand such temperatures under corrosive conditions. For example, activated alumina, a preferred support material for catalysts, has been found to deactivate too rapidly. Previously it had been suggested that the presence of a small amount of thoria stabilizes alumina. However, catalysts prepared with so-called thoria-stabilized alumina do not give satisfactory results.

Generally, one of the characteristics required for a good catalyst support material is a high surface area. It is known that thoria and zirconia compared to the more conventional high-temperature catalyst support materials such as alumina, sinter at intermediate temperatures to relatively low surface area. For example, thoria prepared by the precipitation with $NH_4OH$ from a solution of thorium nitrate and calcined at 500° C. for 2 hours has a surface area of 45 $m^2/g$; calcined at 1,000° C. for 2 hours the thoria has a surface area of 20 $m^2/g$. Zirconia, similarly prepared and calcined at 500° C. has a surface area of 154 $m^2/g$, and <1.0 $m^2/g$ after calcination at 1,000° C.

In view of the foregoing, it was indeed surprising that thoria or zirconia would be useful for this process.

In accordance with this invention thoria and zirconia catalyst carrier materials are prepared which have high areas and which are stable under the severe process conditions described above.

COMPOSITION & STRUCTURE OF CATALYST

The catalyst is comprised of a catalytically active metal deposit dispersed on a carrier material, the carrier material comprising discrete particles consisting essentially of a core of a high surface area inert refractory material and a coating of thoria or zirconia which substantially covers the core.

While thermal stability of the catalyst carrier material is a critical feature of this catalyst, it was found that thoria and zirconia were unique among the coating materials tried. For example, magnesia, titania Titania gadolinia, and samaria prepared for thermal stability were not as effective as thoria or zirconia.

It was also found that to be effective, the core material had to be substantially coated with the thoria or zirconia. Generally, in order to form composite materials that are substantially coated with the thoria or zirconia the coating component is present in a concentration of at least about 10 percent by weight based on the core plus the coating. However, the amount of coating required to coat the core material depends on the surface area and the chemical properties of the core material. The concentration of the coating component generally should not exceed about 50 percent by weight because once the core material is substantially covered further addition of coating material is unnecessary, and the surface area may be adversely affected. Added cost is a further unnecessary consequence since the coating material is more costly, generally, than the core material. Preferably the coating component of the catalyst carrier materials is in the range of 10–30 percent by weight.

As the core of the composite carrier material, any refractory compound can be used which is unreactive with the coating, i.e. the thoria or zirconia, and which can be prepared in high area form. Preferably the core material is also unreactive with the exhaust gases. With respect to the core material, high area means about 100 square meters per gram ($m^2/g$) and higher. Preferably the core material has an area greater than 100 $m^2/g$. This can be achieved by preparing the coated carrier particles with the core material in a very finely divided state, preferably in a colloidal size. Suitably oxides or mixtures of oxides of the following elements may serve as core materials: aluminum, scandium, yttrium, lanthanum, titanium, zirconium, hafnium, tantalum, wolfram, gallium, indium, germanium, tin, uranium, and elements of the lanthanide series. In addition, the following compounds may also be used: $B_4C$, TiC, ZrC, TaC, VC, B, $TiB_2$, $ZrB_2$. A preferred core material is alumina because of its relatively low cost and the fact that its chemistry allows it to be coated easily and completely.

The composite support material may be used in a variety of forms. For example, is may be used as pellets or spheres, as a powder, or deposited on a suitable substrate. Well-known techniques can be used for preparing the desired structures, e.g. the macrosize particles may be formed by compacting or pelletizing the coated particles or by extruding the material after spray drying and mulling. The coated particles may be deposited from a slip, for example, on macrosize inert ceramic structures, spheres or pellets e.g. of alundum, zirconia, or zirconium silicate. Suitable alumina spheres can be obtained commercially, for example, under the name of Alundum from Norton Co. A thin coating of the composite support material may also be deposited from a slip on a unitary ceramic skeletal structure having gas flow passages therethrough. Such skeletal structures are often referred to as corrugated or honeycomb ceramics. Suitable ceramic skeletal structures are supplied commercially by the American Lava Co. under the name of Alsimag or E. I. du Pont & Co. under the name of Torvex. Accordingly such powders, pellets, or coated substrate structures may be used in a fixed or fluidized catalyst bed.

As indicated previously, catalytically active metals for purification of waste gas streams are dispersed on the catalyst carrier materials, and as also noted above, such catalytic metals are well known. Platinum group metals, e.g. platinum, palladium, rhodium, ruthenium, iridium or combinations thereof, for instance, platinum-rhodium or palladium-rhodium are especially suitable. The concentration of the platinum group metals is in the range of 0.05 to 5.0 percent based on the weight of the catalyst plus carrier material.

CATALYST PREPARATION

A. Catalyst Carriers

In accordance with this invention the refractory oxide coating, i.e. the thoria or zirconia, must substantially cover the core materials. To this end the thoria concentration of the carrier materials must be at least about 10 percent by weight. Generally the thoria or zirconia are precipitated from solution on finely divided core material mixed with such solution. The core material has a particle size in the range of 0.01 to 10 microns.

It must be noted that the amount of thoria required to coat the finely divided core material varies depending on the method of preparation and chemical properties of the core material. In a preferred method of coating the core material the presence of only about 10 percent of thoria is required.

According to the preferred method the core material is dispersed as particles of colloidal size in a water miscible liquid, preferably water, an aqueous solution of a water-soluble salt of thorium or zirconium is mixed and stirred with the colloidal dispersion, in a proportion of an equivalent of 10–50 percent thoria or zirconia and the balance core material, and then the thoria or zirconia is precipitated on the core material by addition of an alkaline reagent, the resultant product is filtered, washed and dried, and the coated core material is calcined at a temperature in the range of 500° to 1,000° C.

Methods of preparing colloidal dispersions of suitable core materials, for example refractory oxides, are well known. Colloidal dispersions of alumina in water for example, can be prepared by suspension of Baymal, a colloidal alumina sold by the du Pont Co., in water. As the water soluble salts, thorium nitrate or zirconium nitrate may be used. The composite coated core material containing 10–50 percent thoria or zirconia may be ground, pelleted, prepared for extrusion, or prepared as a slip by well-known method in the art. Optionally the coated core material can be deposited on an inert substrate. Calcination may take place before or after the coated core material is deposited on a substrate, and before or after the catalytically active metal is deposited on the carrier. Preferably the calcination temperature is about 1,000° C. for a period of about 4 hours, and calcination is effected before the active metal is deposited.

It has been found that coprecipitation of alumina and thoria or zirconia, e.g. from a solution of aluminum nitrate and thorium nitrate or zirconium nitrate, is unsatisfactory, since the $ThO_2$ or $ZrO_2$ is dispersed throughout the $Al_2O_3$ structure and does not coat the $Al_2O_3$ surface completely.

B. Catalytically Active Deposit

The catalytically active metal is deposited on the composite support material by well-known techniques. For example, the platinum group metal can be deposited on the support material, e.g. composed of a thoria coating on an alumina core, by slurrying the support material in a water-soluble inorganic salt or salts of the platinum group metal or metals, and precipitating the metal in a free or chemically combined state on the support material. The metal is then activated or reduced to metal by conventional techniques.

EXAMPLES

This invention will be more fully understood by reference to the following illustrative examples. In the examples the catalysts are evaluated in a simulated second stage of a two-stage process for purifying tail gas. A two-stage process is described, for example, in U.S. Pat. No. 2,970,034. In two-stage processes, usually the first stage is run under conditions to reduce the $O_2$ content of the waste stream in order to limit heat buildup in the process. The second stage is normally run under reducing conditions, with an excess of fuel over the stoichiometric amount necessary to reduce the remaining $O_2$ and the oxides of nitrogen. It is the second stage of the two-stage process that is critical, for the gaseous products from this stage are vented to the atmosphere without further treatment. Moreover, the conditions in the second stage are usually milder so that any catalyst deactivation becomes more apparent since less thermal energy is supplied to help the catalyst perform its function. It will be appreciated, however, that the catalysts of this invention may be used in a process using one or more stages to remove the oxides of nitrogen.

Example 1

In this example a composite material is prepared by precipitating thoria with $NH_4OH$ on colloidal alumina and calcining the resultant material. In the example the relative amounts of thorium nitrate and boehmite are varied to give composites containing 5 percent to 67 percent thoria and the balance alumina. This method of preparation is referred to herein as method A.

An aqueous solution of thorium nitrate at ambient temperatures is added, with stirring to a colloidal suspension of boehmite at ambient temperature. The colloidal suspension of the boehmite contains discrete alumina particles in the size range of 0.01 to 10 microns. Then $NH_4OH$, in an amount in excess over the stoichiometric quantity required to precipitate all the thorium as thoria, is added slowly. After mixing for about 15 to 30 minutes the precipitate is filtered, water washed, and dried at 110° C. for 20 hours. Thereafter the composite material is ground to a fine powder and then calcined at 1,000° C.

Measurements of surface areas and the results of X-ray diffraction examination of representative calcined examples are shown in table I.

TABLE I

| Sample | Composition, percent by weight | Calcination | Surface area, m.²/g. | X-ray pattern |
|---|---|---|---|---|
| A-5Th | $5ThO_2$–$95Al_2O_3$ | 4 hrs.—1,000° C | 121 | $\delta$-$Al_2O_3$ |
| A-10Th | $10ThO_2$–$90Al_2O_3$ | 4 hrs.—1,000° C | 135 | $ThO_2$—traces of $\delta$-$Al_2O_3$ |
| A-30Th | $30ThO_2$–$70Al_2O_3$ | 5 hrs.—1,000° C | 111 | $ThO_2$ |
| A-50Th | $50ThO_2$–$50Al_2O_3$ | 2 hrs.—1,000° C | 107 | $ThO_2$ |
| A-67Th | $67ThO_2$–$33Al_2O_3$ | 2 hrs.—900° C | 46.5 | $ThO_2$ |
| A-100Th | $100ThO_2$ | 2 hrs.—500° C | 45 | $ThO_2$ |
| | | 2 hrs.—1,000° C | 20.1 | $ThO_2$ |
| A-0Th | $100Al_2O_3$ | 4 hrs.—1,000° C | 112 | $\theta$-and $\delta$-$Al_2O_3$ |

It was found that about 10 percent $ThO_2$ is required to give surface showing essentially only $ThO_2$ to X-ray. More than about 50 percent $ThO_2$ leads to undesirable reduction in final surface area. Moreover, the area of the core material determines final area (at and below about 50 percent $ThO_2$), therefore the use of colloidal size core material is required.

EXAMPLE 2

In this example samples of thoria and alumina were prepared by coprecipitation of thoria and alumina from solution. The concentrations of thorium nitrate and aluminum nitrate were varied to give samples containing 5 percent and 10 percent thoria. This method is referred to herein as Method Cpt.

To an aqueous solution consisting of thorium and aluminum nitrates, an amount of $NH_4OH$ over stoichiometric is added to precipitate the constituents. After mixing for 30 min. the precipitate is filtered, washed and dried at 110° C. for 20 hours. The samples are calcined for 2 hours at 1,000° C. The results of surface area measurements and X-ray examination on samples prepared by this coprecipitation method are shown in table II.

TABLE II

| Sample | Composition %, by weight | Calcination Treatment | Surface Area m.²/g. | X-ray Pattern |
| --- | --- | --- | --- | --- |
| Cpt-5th | $5ThO_2$–95 $Al_2O_3$ | 1,000° C. | 149 | δ- and θ-$Al_2O_3$ |
| Cpt-10th | $10ThO_2$,90 $Al_2O_3$ | 1,000° C. | 147 | δ- and θ-$Al_2O_3$ and $ThO_2$ |

It was found that coprecipitation of thoria and alumina does not give the required thoria surface—alumina is also present—therefore catalysts prepared in this way are not satisfactory.

EXAMPLE 3

In this example, zirconia coated on alumina particles carrier material is prepared using the method described in example 1, except that zirconia nitrate is used in the slurry.

To prepare sample A-30Zr, $NH_4OH$ is added to a mixture containing zirconium nitrate and colloidal boehmite alumina in the proportions to give a carrier material composed of 30 percent $ZrO_2$–70 percent $Al_2O_3$. The carrier material after calcination at 1,000° C. for 4 hours shows a surface area of 116 m²/g and an X-ray diffraction pattern of $ZrO_2$ with only trace amounts of $Al_2O_3$ lines.

EXAMPLE 4

In this example samples of thoria-alumina and zirconia-alumina carrier materials, prepared according to methods A and Cpt are prepared as a slip and deposited on corrugated ceramic skeletal structures. After depositing palladium on the coated ceramics, the catalysts are aged and then tested in a simulated second stage of a nitric acid plant tail gas purification process.

Catalyst 1, 2, 3, 4, and 5 are catalysts according to the present invention, i.e. they are comprised of thermally stable thoria coated alumina as the catalyst carrier. The thoria coated alumina are prepared using Method A, described in example 1, by precipitation of thoria on colloidal alumina. Substantially only $ThO_2$ is seen in the X-ray diffraction patterns.

Catalyst 6, a catalyst according to the present invention, is comprised of zirconia coated alumina, prepared according to example 3.

Catalysts 7 and 8 are prepared using as the carrier materials samples prepared similar to those identified in table II as Cpt-5 and Cpt-10, i.e. by coprecipitation of thoria and alumina. The X-ray pattern on each sample shows that the thoria does not substantially coat the alumina.

Catalyst 9, 10, 11, and 12 are prepared from 100 percent $Al_2O_3$ as the carrier for the catalytically active palladium.

Each of the carrier materials is prepared as a slip as follows:

To a 2-quart mill jar was added about 400 ml. of $H_2O$, about 4 ml. of concentrated $HNO_3$, and about 400 g. of the carrier material. The mixture is milled for about 20 hours to yield about 775 grams of the working slip.

The slips are applied to zircon-mullite or cordierite porous blocks having 7–8 corrugations per inch (supplied under the names of zircon-mullite or ALSIMAG by The American Lava Co.) by the following method: The corrugated block is dipped in the slip for approximately 2 minutes. The block is removed drained, excess slip removed by a high-pressure airstream and dried at 110° C. and subsequently heated for 2 hours at 600° C. Thereafter palladium is applied to block from an aqueous solution of a palladium salt by precipitation and reduction.

Each of the resultant catalysts is subjected either to an aging treatment paralling plant aging or to an accelerated aging treatment and then is evaluated for efficiency, ignition temperature, and activity in the following test:

The test is carried out by passing a gas mixture at 90 p.s.i.g. at approx. 100,000 HSR over the catalyst. The feed is heated before reaching the catalyst, and gas temperatures just upstream and downstream of the catalyst bed are measured. The preheat temperature is slowly raised until such point at which the downstream temperature takes a sudden rise. This preheat temperature is the "ignition temperature" and is one indication of catalyst activity, i.e., the lower the ignition temperature, the more active the catalyst. Effluent gas samples are taken at these conditions and analyzed. The $CO_2$ content of the effluent and the nitrogen oxides present in the effluent are measured. Here, again, conversion of $CH_4$ to $CO_2$ ("efficiency") and level of nitrogen oxides in the effluent is a measure of catalyst activity. The preheat temperature is then raised to 482° C., normal plant operating temperature, and the effluent again analyzed. The gas mixtures used have the following composition:

$O_2$=1.54 vol. percent
NO=0.23
$H_2O$=
$CO_2$=0.55
$CH_4$=0.91 (10 percent excess) and 0.99 (20 percent excess)
$N_2$=balance A summary of the results is given in table III.

The results in table III show the superiority of the catalysts of this invention. Tests 1, 2, 3, 4, 5 and 6 are performed with catalysts having thoria and zirconia coated alumina as the support material for palladium all reduced the oxides of nitrogen to less than 100 p.p.m. even with only 10 percent excess $CH_4$.

Test 3 shows a catalyst of this invention aged for 501 hours at 800° C. in tail gas. Test 4 shows a similar catalyst agent for 1,005 hours under the same conditions. Comparison of these two tests show that the extended aging under plant conditions causes relatively little decline in activity.

A comparison of tests 1, 2, 3, 4, 5 and 6 with tests 9, 10, 11 and 12 show that the catalysts of this invention were far superior to catalysts having a conventional alumina carrier. Tests 9, 10, 11, and 12 show that after aging the conventional catalysts exhibited higher ignition temperatures, lower combustion efficiency and higher concentration of nitrogen in oxides in the effluent. In addition, a greater activity decline is caused by aging in tail gas compared with air, seen by a comparison of tests 10 and 11.

Tests 1 and 7 were both run with catalysts having 10 percent thoria–90 percent alumina as the carrier material. In the catalyst of test 7, however, the thoria did not substantially coat the alumina. The X-ray diffraction pattern showed $Al_2O_3$ present in the surface. The thoria-alumina of test 7 was prepared by the coprecipitation method of example 2. In test 1

TABLE III

| Test No. | Catalyst composition, percent by weight | Aging treatment | Ign. temp., °C. | Simulated second stage | | | | | |
|---|---|---|---|---|---|---|---|---|---|
| | | | | 10% excess CH₄ | | | 20% excess CH₄ | | |
| | | | | Temp., °C. | Eff., percent | Nitrogen oxides, p.p.m. | Temp., °C. | Eff., percent | Nitrogen oxides, p.p.m. |
| 1 | 1.0% Pd, 10.0% 10ThO₂– 90Al₂O₃ zircon mullite. | 20 hrs. at 850° C. in air and 20 hrs. at 900° C. in air. | 421 | 489 | 95 | 10 | | | |
| 2 | 0.56% Pd, 7.0% 30ThO₂– 70Al₂O₃ zircon mullite. | 20 hrs. at 850° C. in air and 20 hrs. at 900° C. in air. | 429 | 488 | 90 | 91 | | | |
| 3 | 0.60% Pd, 16% 30ThO₂– 70Al₂O₃ cordierite. | 501 hrs. at 800° C in tail gas | 370 | 482 | 100 | 2 | 484 | 100 | 2 |
| 4 | 0.28% Pd, 15.7% 30ThO₂– 70Al₂O₃ zircon mullite. | 1,005 hrs. at 800° C. in tail gas. | 372 | 482 | >95.6 | 23 | 481 | >96 | 7 |
| 5 | 0.50% Pd, 12.0% 10ThO₂– 90Al₂O₃ zircon mullite. | 501 hrs. at 800° C. in tail gas | | 484 | 97.5 | 5 | 486 | 100 | 4 |
| 6 | 0.78 Pd, 23.4% 30ZrO₂– 70Al₂O₃ cordierite. | 501 hrs. at 800° C. in tail gas | 358 | 482 | 100 | 5 | 485 | 95.3 | 6 |
| 7 (Cpt) | 0.5% Pd, 10.0% 10ThO₂– 90Al₂O₃. | 20 hrs. at 900° C. in air | | 489 | (¹) | ² 0.17 | 480 | 42.9 | ² 0.13 |
| 8 (Cpt) | 0.5% Pd, 13.6% 5ThO₂– 95Al₂O₃. | 20 hrs. at 900° C. in air | | 481 | (¹) | ² 0.18 | 487 | 28.3 | ² 0.17 |
| 9 | 0.5% Pd, 9% Al₂O₃ zircon mullite. | 20 hrs. at 900° C. in air | 435 | 481 | 67.1 | 753 | 491 | 66.6 | 944 |
| 10 | 0.45% Pd, 9.3% Al₂O₃ zircon mullite. | 500 hrs. at 800° C. in tail gas | 402 | 488 | 62 | 773 | 482 | 66.1 | 391 |
| 11 | 0.5% Pd, 8.5% Al₂O₃ zircon mullite. | 500 hrs. at 800° C. in air | 380 | 479 | 96.6 | 136 | | | |
| 12 | 0.5% Pd, 8.5% Al₂O₃ zircon mullite. | None | 365 | 485 | 100 | 23 | 482 | 100 | 15 |

¹ Not determined—because of high nitrogen oxide concentration.
² Nitrogen oxides are expressed as percent by volume.

the thoria on alumina was prepared according to example 1, and thoria substantially coated the alumina, as shown by the X-ray diffraction pattern. Both catalysts were aged in air at 900° C. The catalyst of test 1 was, in addition, previously aged for 20 hours at 850° C. A comparison of the results of Tests 1 and 7 show the marked superiority of the present catalyst for the removal of oxides of nitrogen.

As has been described and exemplified above, the present catalysts comprised of high surface area thermally stable thoria or zirconia are particularly suitable for the removal of oxide of nitrogen of waste gas streams such as the tail gas from nitric acid plants. The specific conditions for conducting such purification processes vary with the fuel used, the number of stages used to purify the stream, the catalytically active metal used, etc., and such conditions are well known in the art. Tail gas purification processes are described, for example, in U.S. Pat. Nos. 3,118,727, No. 3,125,408, No. 3,425,803, and the above-mentioned U.S. Pat. No. 2,970,034. Reference to the art will show that in tail gas purification the initial reaction temperature may be in the range from about 100° to 600° C. With $H_2$ as the fuel the ignition temperature may be as low as 100° C. and with methane about 300°–600° C. The bed temperature is, of course, considerably higher. Operating pressures may vary from about atmospheric to 200 p.s.i.g. and higher. Any of the reducing fuels known in the art, e.g. such as $CH_4$ and natural gas, Udex Raffinates, $NH_3$, $H_2$, CO, etc. may be used.

What we claim is:

1. A catalyst which comprises a core of a refractory material having a particle size of 0.01 to 10 microns in size, said refractory core material being unreactive with thoria or zirconia and said refractory core material having a surface area of at least 100 m²/g, a coating of thermally stable thoria or zirconia substantially covering the core material, said coating and core being present in a concentration by weight of about 10 percent to 50 percent coating and the balance the core material, and a platinum group metal deposited on such coating.

2. A catalyst of claim 1 wherein the coating is thoria and the core is alumina.

3. A catalyst of claim 1 wherein the coating is zirconia and the core is alumina.

4. A catalyst of claim 1 wherein the thoria or zirconia coating has a surface area of about at least 50 m²/g after calcination at a temperature of 1,000° C. for 4 hours.

5. A process for the purification of noxious gases containing oxides of nitrogen in order to produce a gas which can be discharged safely into the atmosphere which comprises adding to such gases a reducing fuel and bringing the resultant gaseous mixture in contact with a catalyst of claim 1 at a temperature of about 100 to 600° C. and pressure of about atmospheric to 200 p.s.i.g.

6. A process of claim 5 wherein the reducing fuel comprises methane and the gaseous mixture is contacted with the catalyst at a temperature of about 300° to 600° C.

7. A process of claim 6 wherein the oxides of nitrogen are reduced to less than 100 p.p.m.

8. In a method of preparing a catalyst of claim 1 the steps comprising:
   a. dispersing the inert refractory core material as particles of colloidal size in a water-miscible liquid,
   b. mixing an aqueous solution of a water-soluble salt of thorium or zirconium with the colloidal dispersion of the core particles, said water-soluble salt and core material being present in a proportion of an equivalent of 10–50 percent by weight thoria or zirconia and the balance core material,
   c. adding an alkaline reagent to precipitate thoria or zirconia on the core material and
   d. calcining the coated core material at a temperature in the range of 500° to 1,000° C.

9. A method of claim 8 wherein the alkaline reagent is $NH_4OH$.

10. A method of claim 9 wherein the coated core is calcined at 1,000° C. for 4 hours.

11. A method of claim 8 wherein the core material is alumina.

12. A catalytic structure consisting of a ceramic honeycomb support and a catalyst deposited thereon wherein said catalyst is the catalyst of claim 1.